US008564148B1

(12) United States Patent
Novak (10) Patent No.: US 8,564,148 B1
(45) Date of Patent: Oct. 22, 2013

(54) AC ENERGY GENERATOR (76) Inventor: John J. Novak, Hamilton, NJ (US)

(*) Notice: Subject to any disclaimer, the term of this patent is extended or adjusted under 35 U.S.C. 154(b) by 362 days.

(21) Appl. No.: 13/068,425

(22) Filed: May 11, 2011

(51) Int. Cl.
F01D 15/10 (2006.01)
F02C 6/00 (2006.01)
H02K 7/18 (2006.01)
H02P 9/04 (2006.01)
F03D 9/00 (2006.01)
F03B 13/00 (2006.01)

(52) U.S. Cl.
USPC ............ 290/52; 290/44; 290/54; 290/55

(58) Field of Classification Search
USPC .................... 290/44, 52, 54, 55
See application file for complete search history.

(56) References Cited

U.S. PATENT DOCUMENTS

| 1,740,596 | A | * | 12/1929 | Hohlt | 416/184 |
|---|---|---|---|---|---|
| 1,835,018 | A | * | 12/1931 | Darrieus | 415/224 |
| 4,012,163 | A | * | 3/1977 | Baumgartner et al. | 415/208.3 |
| 4,115,032 | A | * | 9/1978 | Lange | 416/227 A |
| 4,155,249 | A | * | 5/1979 | Scott | 73/40.7 |
| 4,204,796 | A | * | 5/1980 | Pack, Jr. | 415/4.4 |
| 4,386,055 | A | * | 5/1983 | McBride | 422/186.18 |
| 4,624,624 | A | * | 11/1986 | Yum | 416/87 |
| 4,660,390 | A | | 4/1987 | Worthington | 62/309 |
| 4,773,471 | A | | 9/1988 | Grant | 165/60 |
| 4,808,074 | A | * | 2/1989 | South | 416/140 |
| 4,849,647 | A | * | 7/1989 | McKenzie | 290/54 |
| 4,996,850 | A | | 3/1991 | Boxum | 62/409 |
| 5,269,647 | A | * | 12/1993 | Moser | 415/2.1 |
| 5,512,788 | A | | 4/1996 | Berenda | 290/55 |
| 5,911,745 | A | | 6/1999 | Conner | 62/91 |
| 5,998,882 | A | * | 12/1999 | Alston | 290/54 |
| 6,214,303 | B1 | * | 4/2001 | Hoke et al. | 423/210 |
| 6,365,985 | B1 | | 4/2002 | Cohen | 290/55 |
| 6,434,963 | B1 | | 8/2002 | Urch | 62/279 |
| 7,051,548 | B2 | | 5/2006 | Pruitt | 62/314 |
| 7,112,893 | B1 | * | 9/2006 | Villanueva | 290/55 |
| 7,132,760 | B2 | * | 11/2006 | Becker | 290/55 |
| 7,153,092 | B1 | | 12/2006 | Randolph | 416/55 |
| 7,200,005 | B2 | * | 4/2007 | Von Gutfeld et al. | 361/695 |
| 7,335,000 | B2 | * | 2/2008 | Ferguson | 417/7 |
| 7,362,004 | B2 | * | 4/2008 | Becker | 290/55 |
| 7,538,447 | B1 | | 5/2009 | Berenda | 290/55 |
| 7,602,077 | B2 | * | 10/2009 | Ferguson | 290/55 |
| 7,675,189 | B2 | * | 3/2010 | Grenier | 290/54 |
| 7,775,761 | B2 | * | 8/2010 | Ferguson | 415/7 |
| 7,816,800 | B2 | * | 10/2010 | Grenier | 290/54 |
| 7,834,477 | B2 | * | 11/2010 | Sheikhrezai | 290/55 |

(Continued)

Primary Examiner — Pedro J Cuevas
(74) Attorney, Agent, or Firm — William Lawrence Muckelroy (57) ABSTRACT An electricity generator powered by air flowing from an air conditioner exhaust having a grill housing attached, the grill housing made of wind turbines connected to movable magnets freely movable clockwise or counter-clockwise to function whether the air flows in a first direction or opposite the first direction, thereby arranged to generate electromotive electricity as the turbines move, the turbines being oriented transverse to the air flow and a plurality of screws attaching the grill containing the wind turbines in a fixed transverse orientation relative to the air flow direction of the air conditioner exhaust wherein the wind turbine has a cage-like propeller with at least one flattened blade having a 180 degree twist located about mid-point and connected to a shaft, the shaft being connected to a generator and driving the generator creating electricity by moving conductors in a magnetic field. The grill holds the wind turbine so the blades are turned by exhaust air from the air conditioner and electricity is generated by moving conductors through alternating north and south magnetic fields.

8 Claims, 10 Drawing Sheets

(56) References Cited

U.S. PATENT DOCUMENTS

| | | | |
|---|---|---|---|
| 7,859,126 B2* | 12/2010 | Ferguson | 290/44 |
| 7,868,476 B2* | 1/2011 | Baca et al. | 290/55 |
| 8,067,852 B2* | 11/2011 | Ortiz et al. | 290/55 |
| 8,105,010 B2* | 1/2012 | Van De Klippe | 415/4.3 |
| 8,143,737 B2* | 3/2012 | Ortiz et al. | 290/54 |
| 8,148,838 B2* | 4/2012 | Ferguson | 290/44 |
| 8,183,709 B1* | 5/2012 | Manning | 290/55 |
| 8,278,777 B2* | 10/2012 | Buns | 290/55 |
| 8,362,635 B2* | 1/2013 | Ortiz et al. | 290/55 |
| 2004/0061337 A1* | 4/2004 | Becker | 290/44 |
| 2006/0156725 A1 | 7/2006 | Kenessey | 60/641.12 |
| 2007/0018464 A1* | 1/2007 | Becker | 290/55 |
| 2007/0029807 A1* | 2/2007 | Kass | 290/55 |
| 2008/0238105 A1* | 10/2008 | Ortiz et al. | 290/54 |
| 2008/0272603 A1* | 11/2008 | Baca et al. | 290/55 |
| 2008/0273974 A1* | 11/2008 | Becker | 416/7 |
| 2009/0146425 A1* | 6/2009 | Widisky | 290/44 |
| 2010/0230973 A1* | 9/2010 | Ortiz et al. | 290/55 |
| 2010/0244455 A1* | 9/2010 | Berginc | 290/55 |
| 2011/0027084 A1* | 2/2011 | Rekret | 416/126 |
| 2012/0187698 A1* | 7/2012 | Bassett | 290/55 |

* cited by examiner

AC ENERGY GENERATOR

PRIORITY DATE CLAIMED

The priority date claimed is May 20, 2010, the filing date assigned to this non-provisional application for a patent on this invention.

BACKGROUND OF THE INVENTION

1. Technical Field of the Invention

The technical field of this invention concerns green energy or electricity generation from energy inherent during the movement of air from an exhaust of either a customary central or window air conditioner or heat pump.

2. Description of the Related Art

A need exists to increase the efficiency of machines used to cool and heat homes that are customarily referred to as air conditioners or heat pumps and consume alternating current electricity to power a compressor. The prior art developed to address this problem up to now has been from wind using a multiple blade like that of a fan mounted and turning on a shaft of a conductor, e.g. iron based stators, that move in a magnetic field to create electricity.

Windmills, or wind turbines which generate electricity from the wind are well known. Increasing efficiency of such generators and increased cost of traditional fossil fuel energy sources have lead to significant use and commercial development of wind-driven generators relying on natural air movements. Such windmills frequently are placed in windy areas and mounted on tall posts or columns. These windmills may rotate to face changing wind direction. The novel invention has as one primary objective the elimination of the need to move the turbine blade in an effort to face changing wind direction.

Other wind-driven electric generating systems have used air intake to drive the windmills. Recent inventions have attempted to collect moving air created by traveling motor vehicles to generate electricity.

On May 26, 2009, Berenda and Ferenci were awarded U.S. Pat. No. 5,512,788 for a system, which utilizes wasted or exhaust airflow from one or more ventilation systems of a bounded area such as a mine, a tunnel, or some other area requiring ventilation. This patent is incorporated herein as background art to assist the comprehension of advancement disclosed by new blades of the novel invention. Their system utilizes existing wind-powered electric generating equipment in front of the exhaust fan of the ventilation systems. It was issued within one year of the priority date of this application. Known wind powered electric generating systems, however, have not utilized exhaust air from relatively low volume non-ventilation sources typically found in air conditioner exhaust. The present invention can utilize a uniquely low volume of airflow to generate electricity.

Also of interest to this inventor is U.S. Patent Publication 2006/0156725 entitled "Power Generation from Solar and Waste Heat" by Kenessey published in 2006, also incorporated herein by reference.

The invention suggested by Kenessey relates generally to the generation of electricity and the ventilation of urban areas with the use of waste "heat" from air-conditioning systems. The related aspect to this novel invention involves creation of a column of rising air in a stack to drive electricity-generating turbines.

The general concept of using a turbine having air blown blades as a source of electricity is suggested in U.S. Pat. No. 7,153,092 issued to Randolph on Dec. 26, 2006. What is suggested and taught as novel is the use of a plurality of turbines or blade sets without regard to their shape or structure.

An earlier teaching of Berenda et al. in U.S. Pat. No. 5,512,788 which issued on Apr. 30, 1996 also describes capturing exhaust air from a bounded space or plenum and converting the moving air via a conventional turbine system to electrical energy wherein the generating equipment or turbine is structurally required to be suitably positioned in front of the exhaust fan. Today some blower blades are located below or to the side of the compressor, while other designs require the blower blade to be located above it, and still other designs have the blades located and rotated to draw air into the space occupied by the compressor. The novel structure disclosed is adapted to accommodate each of the foregoing structural arrangements by using the blade design. This is intuitively proven by the fact that it inherently adapts to capture airflow from any direction.

SUMMARY OF THE INVENTION

The present invention structurally improves an existing wind powered generator by a novel rotating blade and design and mounting the generator in proximity to the air flowing into or out of the compressor housing. A novel shroud either circular to fit on top of a housing or curved to fit around a cylindrical housing is provided. The shroud is a grill that collects the circulating airflow and directs it to a plurality of wind turbines made of a plurality of closed end blades centrally twisted 180 degrees. As the airflow passes through the grill the novel blade structure insures that the turbine shaft is spun and electricity is virtually always generated when airflow is present. The novel blade design further serves to protect any person in the vicinity of the grill from harm.

OBJECTS OF THE INVENTION

Accordingly, it is an object of the present invention to provide a new and improved electrically powered air conditioner with self-generated assisting supplementary electric power.

Another object of the present invention is to provide a new and improved air conditioner which utilizes an air flow energy converter and exchanger for indirectly reducing the total energy drawn from a commercial electricity supply grid to change the temperature of the air being conditioned thereby.

Another object of the present invention is to provide a new and improved air conditioner which utilizes air flow from the AC for indirectly cooling the air being conditioned via airflow driven turbines.

Another object of the present invention is to provide a new and improved air conditioner of the above-described character, which utilizes some of the blown out air from the compressor or heat exchanger without admixture to accomplish a reduction in the electricity, used off the grid.

Yet another object of the present invention is to provide a new and improved air conditioner of the above-described character, which includes an air output mechanism or disk which uses ambient air under pressure to a turbine and electromagnetic electric generator structure so that the air passes therethrough wherein the kinetic energy of the air flow is converted to electricity that is used by the air conditioner.

Another object of the present invention is to provide a new and improved air conditioning structure of the above described type which includes means for diverting some of the air emerging from the heat exchanger structure and directing it without admixture into a novel rotating blade turbine chamber, which is operated to supplement the electrical requirements of the heat exchanger structure.

Another object of the present invention is to provide a new and improved air conditioning structure of the above described character wherein the exhaust chamber includes an input portion for receiving the diverted air and directing it through an inverted egg beater-like blade nest located above the heat exchanger structure to generate an electrical output.

The foregoing and other objects of the present novel invention as well as the invention itself may be more fully understood from the following description when read in conjunction with the accompanying drawings.

BRIEF DESCRIPTION OF THE DRAWINGS

For a full and plenary understanding of the specific nature of the present novel invention, reference is made to the following detailed description of the preferred embodiment taken in connection with the accompanying detailed drawings in which:

FIG. 2A is a cross-section of the grill shown in FIG. 1 taken at the plane a-a' shown in FIG. 1 associated with directional arrows a and a'; and, FIG. 2B is a perspective view of the aforementioned cage-like structure shown used to drive and turn an electromagnet turbine made of circularly oriented alternating permanent magnets located in a rotatable wheel e spaced a pre-selected distance from a fixed stator f; and, FIG. 2C is another perspective view of a wind capture means or cage-like structure previously shown in FIG. 2B; and, FIG. 2D is a side view of the cage-like structure previously shown in FIG. 2B further illustrated and augmented with a dotted line plane d-d' showing a direction of view to the right for the plane d-d' wherein arrows d, d' indicate a direction of view; and, FIG. 2E is a perspective cross-section of a right side view of the cage-like structure shown in FIGS. 2B, 2C, and 2D viewed at the plane d-d' with the direction pointing to the right from the plane d-d' wherein rotatable elements are shown twisted 180 degrees forming opposite facing 90 degree air scoops extending from each middle to the connection point of a blade of the cage-like structure; and, FIG. 2F is an internal view of the alternator f and a plan view of a circular permanent magnet arrangement; and, FIG. 2G is a view of the inside surface of one of a pair of rotatable plates e; and, FIG. 3 is a top perspective view of the novel grill shown in FIG. 2; and, FIG. 4 is a top perspective view of the walls for the novel grill, with all moving parts removed; and, FIG. 5 is flow diagram showing elemental parts for the operation of the novel invention and further illustrating the flow of electricity and the connection of the electricity generated by the turbines via a switch to a commercial electrical grid; and, FIG. 6A is a perspective view of the cage-like structure; and FIG. 6B is a left end view of the structure shown in FIG. 6A; and, FIG. 6C is a side view of the cage-like structure shown in FIG. 6A; and, FIG. 7 is a cut-a-way view showing the center shaft b extended between support bearings at each end of a-a'.

DESCRIPTION OF THE PREFERRED EMBODIMENT

The primary purpose of the novel invention is to integrally decrease the amount of energy that an air-conditioned building consumes when an air conditioner or AC of specific design is operating. The specific AC is commonly referred to as a central AC compressor unit that is mounted outside the building on a support platform. The unit is cooled by air blown over the compressor as it heats up to cool it somewhat.

Figure 5:
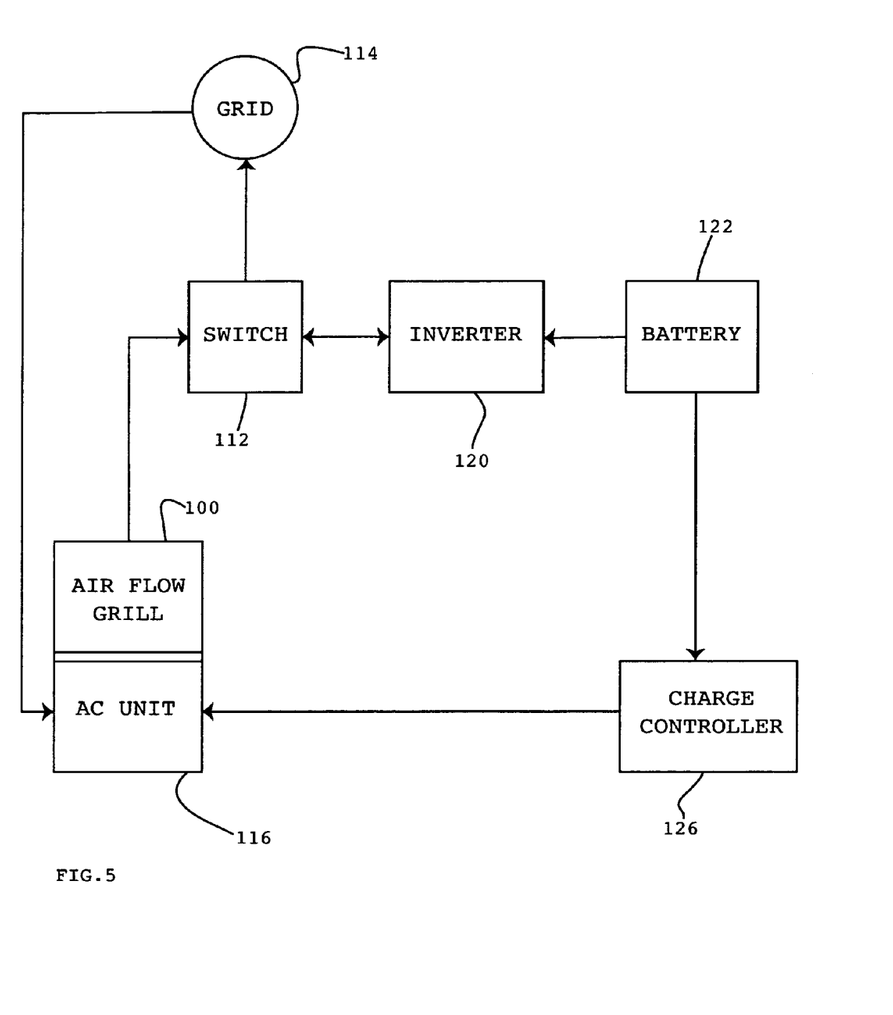
Figures 6A, 6B:
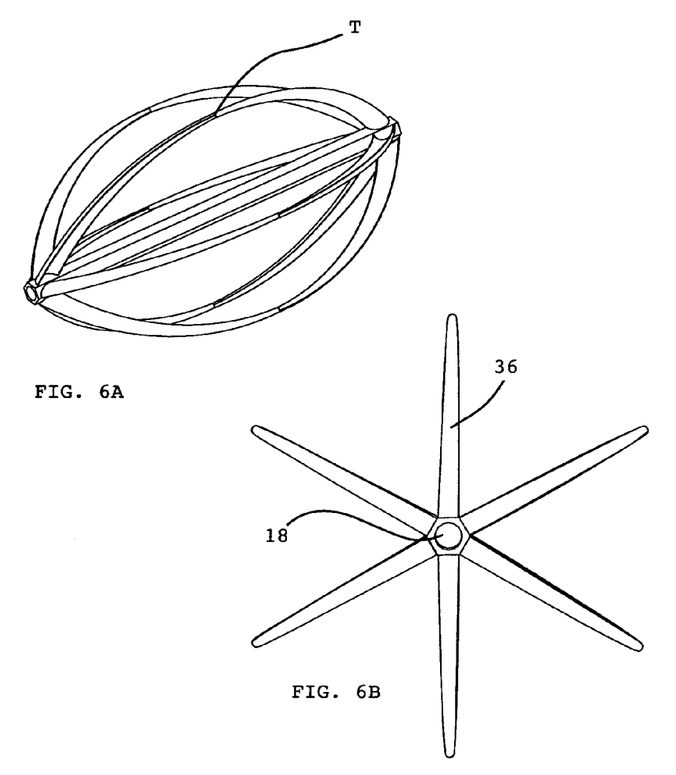
Figure 6C:
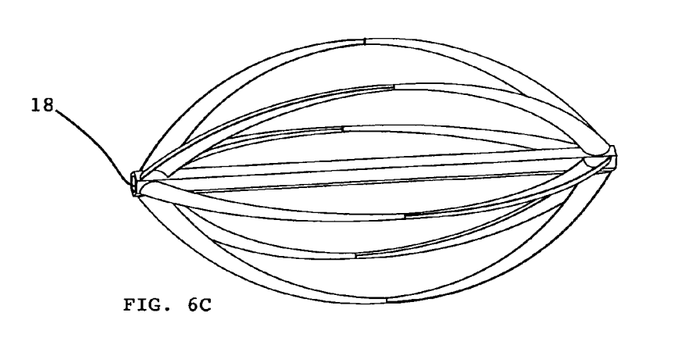

The novel invention is an add-on structure or disk 10 connected to an independent electrical box (not shown) containing the elements in the flow chart shown in FIG. 5 with the exception of the AC unit 116. The installed disk 10 is circular shaped, for example, and has therein a plurality of electro-magnetic generators 20 powered by a plurality of closed circular blade turbines on shafts 18. The turbines each have a plurality of uniquely arranged closed circular blades 36 each connected to a shaft 18 that forms a part of the generator 20. Therefore, a turbine and a generator 20 are each mounted centrally on its shaft 18. The fixed axis of each cage-like structure is oriented orthogonal to airflow from an exhaust plume from an air conditioning unit. The AC airflow is utilized to turn the turbine blades 36. This arrangement causes electricity to be generated by the turning of the blades 36.

Figure 2:
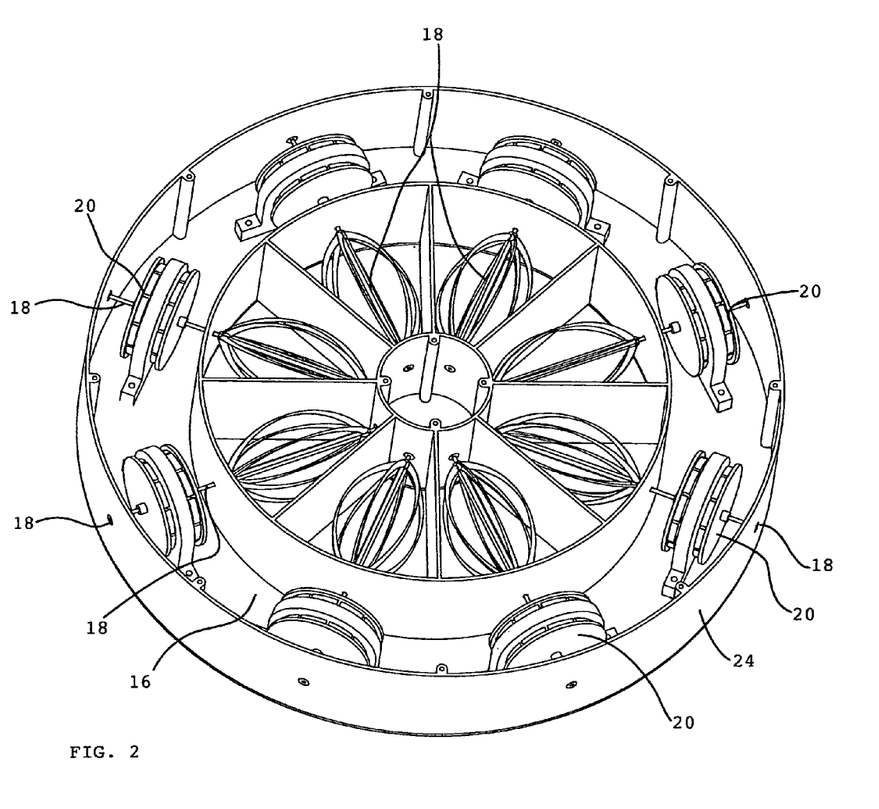
FIG. 2 is a top perspective view of the novel cylindrical grill for mounting on top of an exhaust vent of an outdoor air conditioning system with the top lid removed revealing several cage-like blade structures each connected to an electromagnetic turbine generator attached to a floor of the grill, the turbines containing a plurality of magnets arranged in a circle each with a rotatable axis extending through the turbine and a blade structure to an inner ring.
Figure 2A:
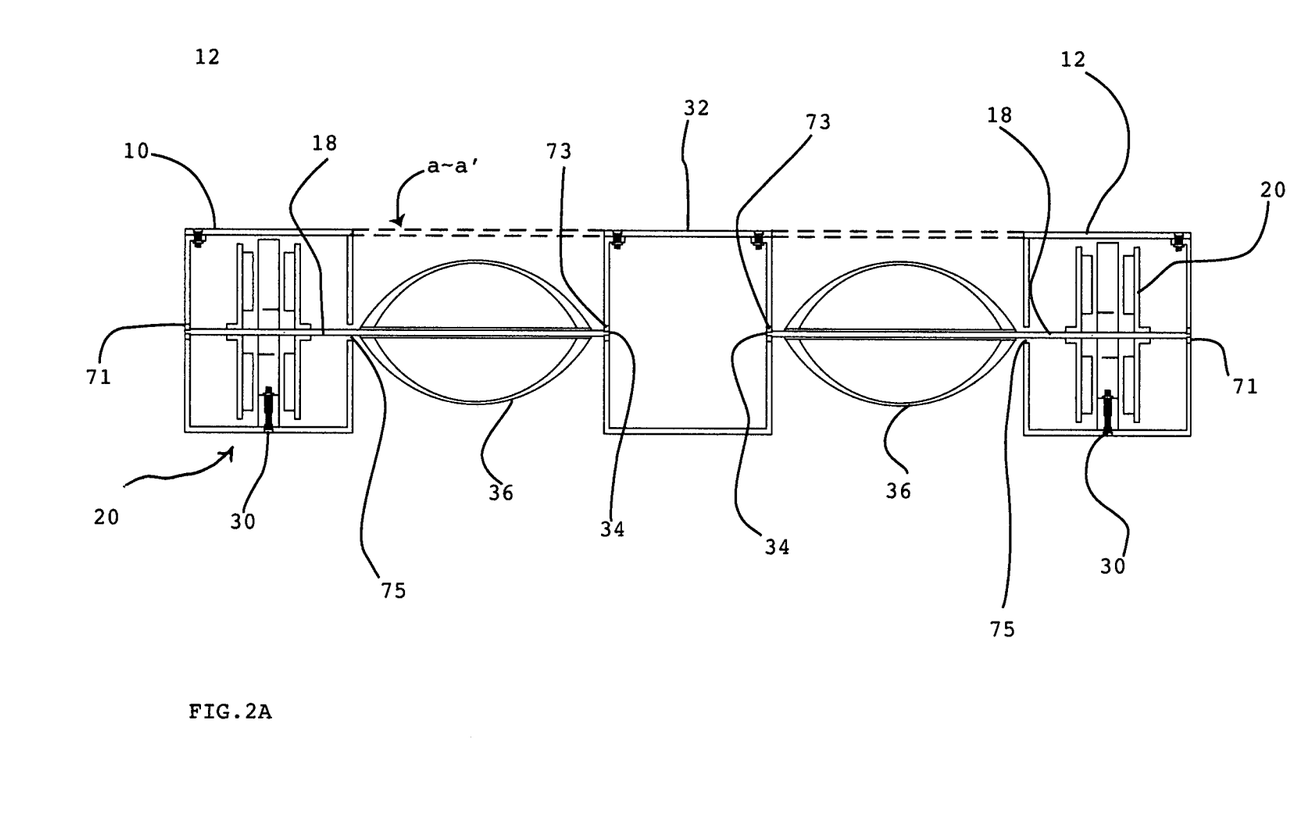
Figure 2B:
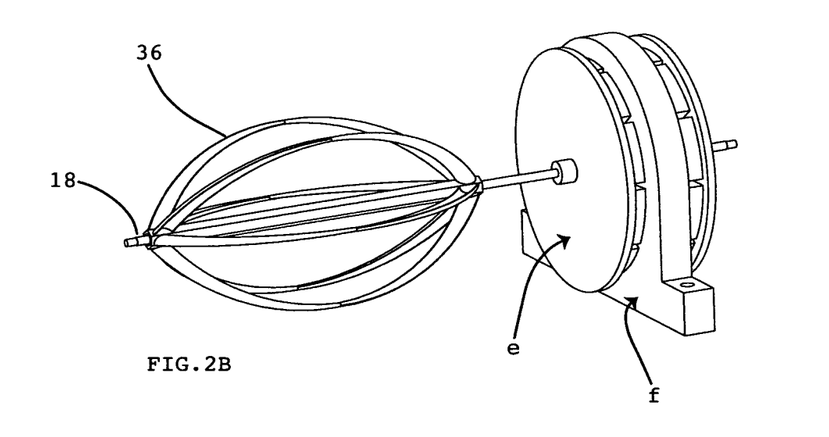
Figures 2C, 2D, 2E:
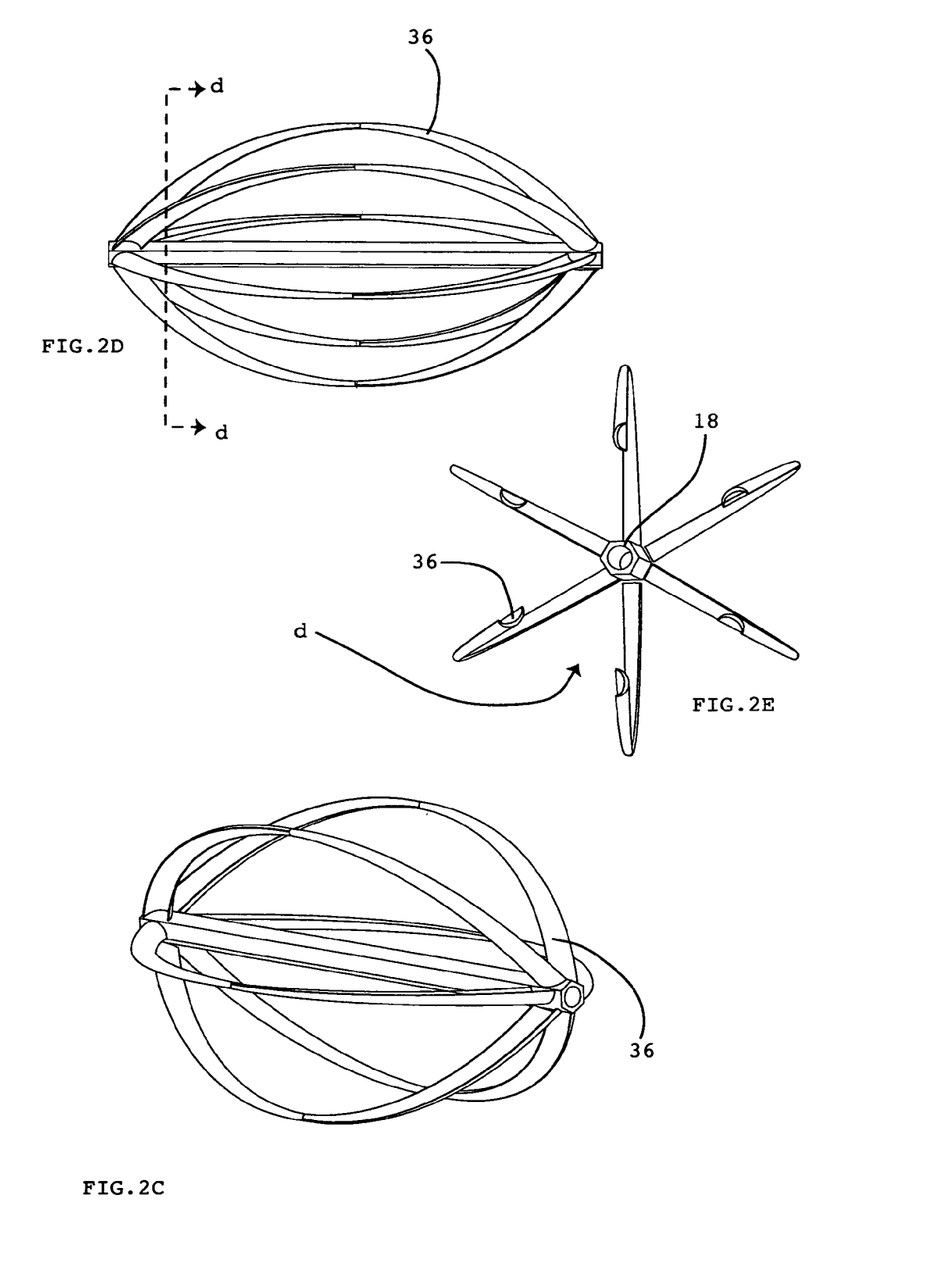

For a detailed view of the blades 36, each is shown in FIGS. 2C, 2D, and 2E wherein at the middle of each the substantially flat blades 36 are shown structured wherein each blade 36 is twisted or turned 180 degrees at each middle and each is curved before the twist such that at each end opposite the other a scoop structure is formed as shown in detail in FIG. 2E. This novel structure for the curved blades 36 enables at least one half of each blade to have a scoop moving to catch substantially more wind flow and turbulence blowing from the AC unit than would otherwise occur.

Referring to FIG. 5 the electricity generated by the disk 10 mounted in the air flow grill 100 adapted to capture air flow and turbulence is directed to an electrical switch 112 which in turn is connected to a commercial electricity grid 114 that supplies electricity directly to the AC unit 116 in addition to others connected to the grid 114 but not shown. As needed the electricity flowing from the air flow grill 100 may be inverted or conditioned by an inverter 120 connected to the switch 112 and either supplied or directed by a direct connection to charge a storage battery 122 adapted for re-charging. Alternatively, current from the battery is directed to an electronic controller 126 designed to convert the direct current flowing from the storage battery 122 to alternating current that is usable by the AC unit 116.

Electricity stored in the system's battery 122 can be electronically directed to a charging controller 126 that enables the electricity to be shaped such that it can be combined with electrical power from the grid 114 to supplement power needed for operation of the AC unit 116.

Basic principles of thermodynamics are employed and are exemplified in U.S. Pat. No. 6,365,985 issued to Cohen on Apr. 2, 2002, which is hereby incorporated herein in its entirety by reference. The novel invention described herein is the double opposing scoop blade shape adapted for the cage-like units with blades 36 and is a novel improvement over Cohen in that the turbine blades are uniquely more efficient and more suitable to be driven by the exhaust air from the AC unit 116. The curving and twist of the blades 36 is more efficiently shaped. Each blade has a curved or C-shaped cross-section. Each blade is scoopingly twisted with each end oppositely twisted from the other as illustrated in FIGS. 2C, 2D, and 2E.

The novel system enables a standard 30 amp/220 volt air conditioning unit to partly run off the energy that it creates with, of course, the due application of the laws of thermodynamics and friction accounting for some energy conversion and feedback losses.

Pruitt demonstrated the thermodynamic viability of such energy recovery in U.S. Pat. No. 7,051,548 that issued on May 30, 2006. Pruitt noted the system requires so little power it can be operated on a battery system charged from ambient energy or air flow harvested by, for example, a small wind turbine or an array of conventional 30 volt 4 amp hour solar cells.

Evaporative cooling systems have been combined into more elaborate systems that include heating means. See, for example, Grant et al. U.S. Pat. No. 4,773,471. Conventional evaporative cooling systems have also been combined into elaborate systems with refrigerated air systems. See, for example, Conner U.S. Pat. No. 5,911,745.

Urch U.S. Pat. No. 6,434,963 discloses an air cooler with two air flow paths, namely, an inlet path for outside air and an outlet path for stale air. A heat exchanger pre-cools the fresh air with heat extracted from the stale air, and further cooling is achieved by means of an evaporative cooler that spans the two air flow paths. None of these systems offers the use of the bare exhaust of an outside condenser or compressor air flow to generate and store electricity and cycle that electrical energy back into the electrical circuit wired to a supply grid such that it is used to reduce the amount of electricity needed to run the condenser or compressor.

Those concerned with these problems recognize the need for an improved air conditioning system attachment, which is easily mounted. The novel mounted grill converts airflow using wind turbine principles to convert the air flow energy to AC power at the air source.

The exhaust from the AC unit 116 comes out at an average speed of 25 mph. This constant wind speed is a great source for renewable energy. A grill 38 comprised of a number of small wind turbines is mounted on top of the ac unit. The electricity created by the wind turbine comprising cage-like structures 36 is then wired to a charge controller, and from the charge controller, the electricity will then be wired into a number of batteries to store the electricity. Those batteries can be wired to an inverter and an automatic digital transfer switch using techniques common in the art. The digital transfer switch is wired to the panel on the building and also wired back to the ac unit to complete the cycle.

The way this system works is that on a hot day, the homeowner turns on the ac unit from the thermostat as usual. The ac unit kicks on by the power supplied from the utility company. Once the ac unit is on, the exhaust air turns the turbine motor to generate electricity. That electricity then gets stored in the batteries. The amount of electricity stored in the batteries is detected by the automatic transfer switch. Once the ac unit has generated enough electricity to run on its own power stored in the batteries, the transfer switch cuts off power from the utility company and allows the ac unit to run off of the battery. Once the unit has used up all of its electricity created, the switch cuts off the power from the batteries and allows the ac unit to run off the power from the grid 114 supplied by the utility company. Once the power in the batteries fill up again, the process will repeat itself.

The gist of the improvement is to enable an energy consumption point such as an AC unit to run in part from its own created air flow power after conversion to AC current at a predetermined voltage.

Figure 1:
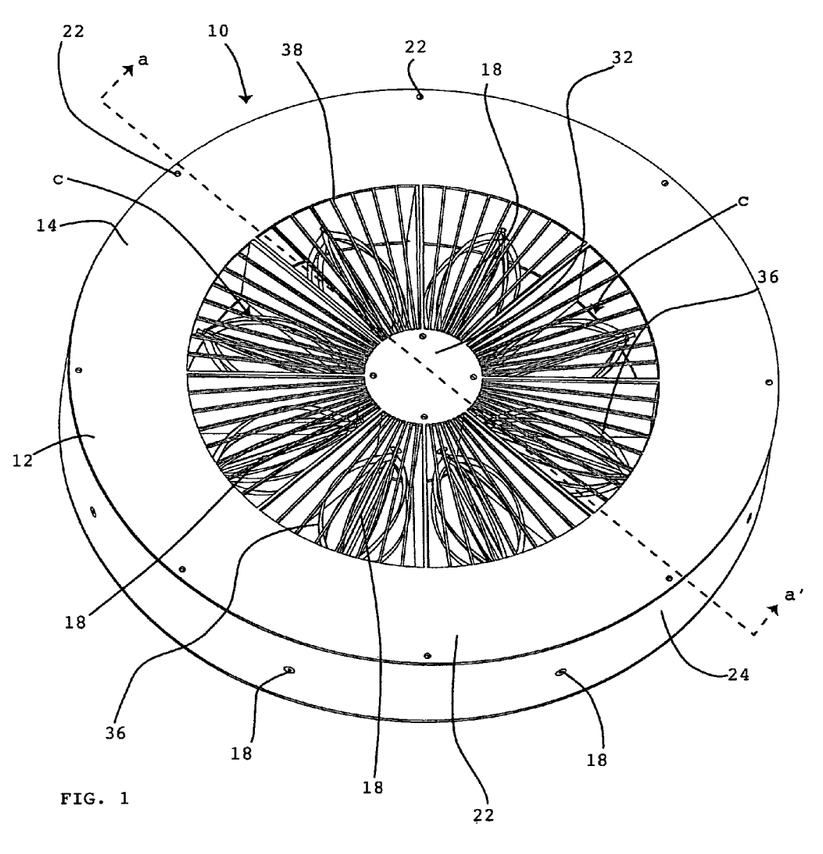
FIG. 1 is a top perspective view of a novel cylindrical grill for mounting on an exhaust vent of an outdoor air conditioning system.

Referring again to FIG. 1 there is shown a grill 38 for the novel invention. The grill 38 is assembled using a plurality of movable and stationary parts. The grill 38 has a cover 12. The cover 12 has a flat annular outer shell 14 and matching floor shell 16 (not shown) to which a plurality of electromagnetic wind turbine powered shafts 18 are firmly mounted.

The floor shell 16 is shown in FIG. 2 supporting electromagnetic generators 20. The floor shell 16 and the annular shell 14 are held in place with a multiple flange and screw pairs 22 as fully illustrated in FIG. 1. A vertical wall 24 receives an end of each of the electromagnetic wind turbine powered shafts 18 as fully shown in FIGS. 1 and 2.

Referring to FIG. 2A there is shown a cross-section of the grill 38 taken at the plane a-a' where there is further shown a cross-section of two turbines 20 mounted on the floor shell 16 with screws 22, for example. Also shown is a closed plenum 32 for added rigidity and to receive an opposite inside end 34 of the power shafts 18. The heart of the novel structure resides in the oval rotatable cages (and blades 36) shown in cross-section in FIG. 2A and further illustrated as lying beneath a wire grill 38 that is an integral part of the cover 12 (see FIGS. 1 and 2A).

Figure 7:
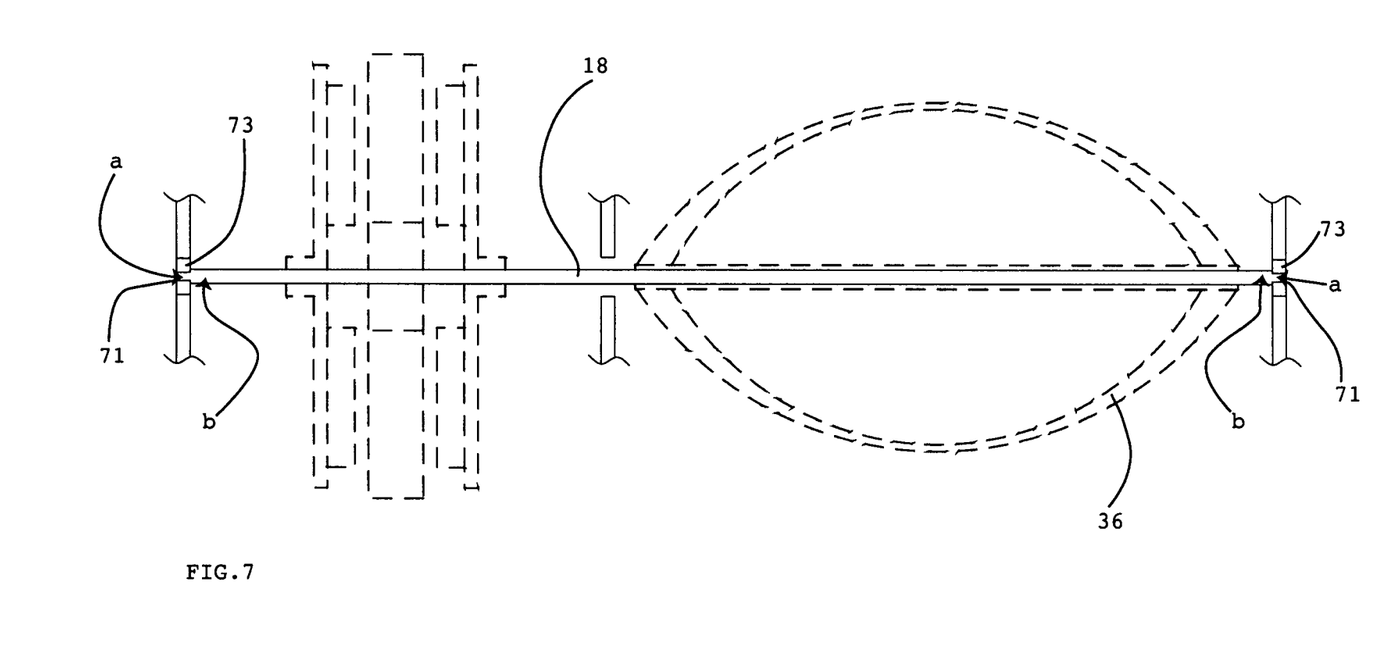

Referring to FIG. 7 the cages 36 are preferably mounted with their shafts 18 supported by usual and customary annular ball bearing assemblies 73. Each assembly 73 has an aperture 71 adapted to rotably receive an end of the shaft 18 such that the shafts rotate freely clockwise or counterclockwise subject to how the air flow turns the blades of the structures 36 which are cage-like multiple structures 36. Each turbine blade 36 fixed to a shaft 18 produces electricity notwithstanding the direction of movement of a plate e (see, FIG. 2e) shown there. The cages 36 comprise a plurality of specifically shaped blades as shown clearly in FIGS. 2D and 2E.

Figures 2F, 2G:
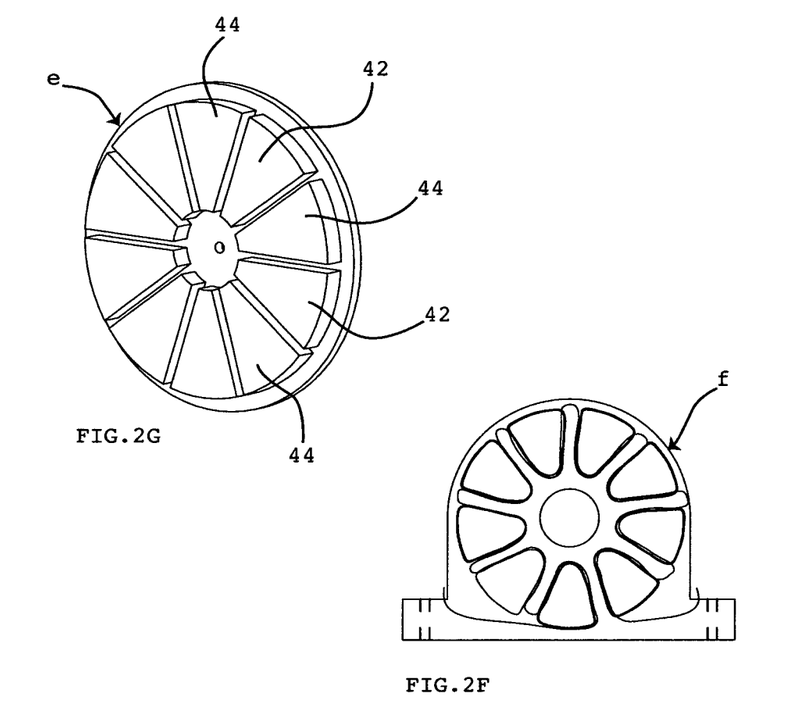
Figure 3:
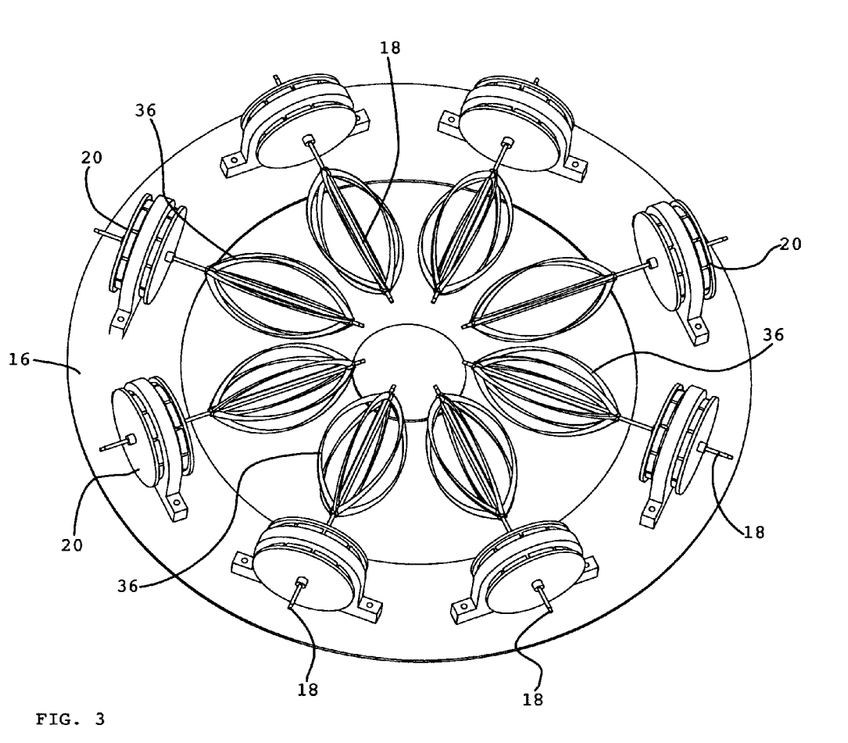
Figure 4:
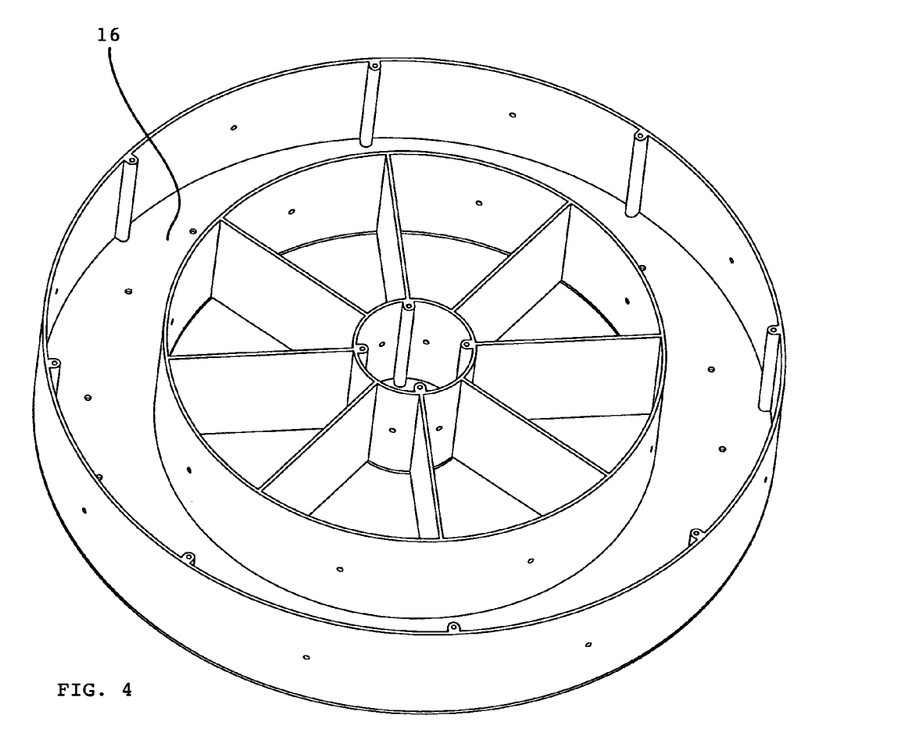

The inside surface of the plate e is shown in detail in FIG. 2G. There is shown an even numbered assembly of alternating pole magnets 42, 44 spaced away from the previously described stationary structure f shown in FIG. 2F with its circular array of magnets. Rotation of the plate e is a consequence of rotation of the structure 36 (see FIGS. 2B and 7).

PARTS LISTING plate e
stationary structure f
twist T
disk 10
cover 12
outer shell 14
matching floor shell 16
shaft 18
turbine 20
flange and screw pairs 22
vertical wall 24
closed plenum 32
inside end 34
oval rotable cage turbine blade 36
wire grill 38
alternating pole magnets 42, 44
aperture 71
annular ball bearing 73 hole 75
air flow grill 100
switch 112
grid 114
AC unit 116
inverter 120
battery 122
charge controller 126

What is claimed is:

1. An air flow energy recovery system for recovering energy from air flowing out of a unit having at least one exhaust face with at least one exhaust location wherein a fan fixed in proximity to the unit circulates air from the unit comprising:
   (a) an electrically powered air blower having a propeller mounted on a motor, whereby the air blower produces an air flow, the air flow being blown in a selected direction;
   (b) a grill attachable to one exhaust location, the air flow having at least one outlet location constrained by the grill, the grill containing at least one oblong squirrel cage having rotable blades, a shaft supported at each end by bearings, wherein the air flow from within the housing is expelled
   out of the housing as directed air flow directed through the grill covering at least one exhaust location; and
   at least one squirrel cage circulatable independent to any other when air flow is directed in the vicinity of the squirrel cage fan structures, the squirrel cage fan structures each being exterior to the housing and inside the grill, each squirrel cage fan structure being spaced a selected distance from the housing to allow the squirrel cage fan to rotate freely, each such squirrel cage fan structure having: a rotatable shaft; a plurality of vanes attached to said rotatable shaft, wherein the air flow acts on at least one of said vanes, rotating said rotatable shaft; and an electrical generator connected to said rotatable shaft.

2. The energy recovery system of claim 1 wherein electrical energy from said electrical generator is directed to a converter and converted to alternating current.

3. The energy recovery system of claim 1 wherein the electrical energy from said electrical generator is directed onto an electrical grid connected to the air conditioner.

4. The energy recovery system of claim 1 further comprising a feed from the electrical generator to an electrical system for providing a supply of electrical power to the unit.

5. The energy recovery system of claim 4 further comprising a device for connecting the electrical generator to a power system and means for selectably connecting the electrical generator to either the unit or the public power system.

6. The energy recovery system of claim 5 wherein each blade of each squirrel cage fan is a flattened elongated rectangular piece of durable material, each blade being formed into a semi-circle with an apex and having a first end and a second end, the first end being connected at a first location on the shaft, the second end being connected at a second location on the shaft, each blade being gradually twisted to one hundred and eighty degrees at its apex whereby capture of air currents by each blade is improved.

7. The energy recovery system of claim 6 wherein each said shaft has a middle section contiguous to the first location and contiguous to the second location and located in between the first location and the second location, the first end of the shaft extending through a bearing having a round opening for receiving the first end of the shaft, the second end of the shaft extending through another bearing having another round opening for receiving the second end of the shaft, the shaft having a variable diameter, the variable diameter of the shaft being largest at the middle of the shaft and substantially tapered at each end sufficient for the shaft to maintain its position wherein the first and second ends remain retained in their respective bearing openings.

8. The energy recovery system of claim 1 further comprising a feed for connecting the electrical generator to a public power system.

\* \* \* \* \*